United States Patent
Liu et al.

(10) Patent No.: US 9,667,178 B2
(45) Date of Patent: May 30, 2017

(54) VARIABLE FREQUENCY SPEED CONTROL SYSTEM AND METHOD OF THE SAME

(71) Applicant: Delta Electronics (Shanghai) Co., Ltd., Shanghai (CN)

(72) Inventors: Bin Liu, Shanghai (CN); Zheng Wang, Shanghai (CN); Yi Zhang, Shanghai (CN); Hong-Jian Gan, Shanghai (CN); Jian-Ping Ying, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 84 days.

(21) Appl. No.: 14/710,582

(22) Filed: May 12, 2015

(65) Prior Publication Data

US 2015/0349681 A1 Dec. 3, 2015

(30) Foreign Application Priority Data

May 30, 2014 (CN) .......................... 2014 1 0241036

(51) Int. Cl.
*H02H 7/08* (2006.01)
*H02P 27/00* (2006.01)
(Continued)

(52) U.S. Cl.
CPC .............. *H02P 6/08* (2013.01); *H02P 27/047* (2013.01); *H02P 27/06* (2013.01)

(58) Field of Classification Search
CPC . F03D 9/003; H02J 3/386; H02J 3/383; H02J 3/382; Y02E 10/763; Y02E 10/72;
(Continued)

(56) References Cited

U.S. PATENT DOCUMENTS 7,948,102 B2 * 5/2011 Schubert ................. H02P 9/007
290/44
8,097,971 B2 * 1/2012 Ichinose ................. F03D 9/003
290/44
(Continued)

FOREIGN PATENT DOCUMENTS

CN 101479928 A 7/2009
CN 102291085 A 12/2011
(Continued)

*Primary Examiner* — Paul Ip
(74) *Attorney, Agent, or Firm* — CKC & Partners Co., Ltd.

(57) ABSTRACT

A variable frequency speed control system having a low voltage ride through function that includes a variable frequency drive having a rectifier, a DC bus and an inverter is provided. The variable frequency speed control system includes a voltage drop detecting module, a frequency control module, an operation mode selecting module and an inverter control module. The voltage drop detecting module generates a voltage drop coefficient according to a grid voltage and a rated grid voltage and generates an operation mode switching signal. The operation mode selecting module receives a target frequency signal and a frequency decreasing amount and generates an output frequency signal according to the operation mode switching signal. The inverter control module generates a three phase modulating signal according to the output frequency signal, which is used to control the operation of the inverter.

14 Claims, 4 Drawing Sheets

(51) Int. Cl.
*H02P 6/08* (2016.01)
*H02P 27/04* (2016.01)
*H02P 27/06* (2006.01)

(58) Field of Classification Search
CPC ....... Y02E 10/56; Y02E 10/725; Y02E 10/76; Y02E 10/563; H02P 2101/15; H02P 9/007; H02P 29/0241; H02P 29/032; H02P 9/10
USPC ................. 318/400.2, 400.21, 400.3; 290/44
See application file for complete search history.

(56) References Cited

U.S. PATENT DOCUMENTS

| | | | |
|---|---|---|---|
| 8,129,933 B2 | 3/2012 | Maeda | |
| 8,970,057 B2* | 3/2015 | Li | F03D 9/003 |
| | | | 290/44 |
| 9,276,498 B2* | 3/2016 | Lin | H02M 7/44 |
| 2007/0076444 A1 | 4/2007 | McNulty et al. | |
| 2009/0250931 A1* | 10/2009 | Schubert | H02P 9/007 |
| | | | 290/44 |
| 2009/0278354 A1* | 11/2009 | Ichinose | F03D 9/003 |
| | | | 290/44 |
| 2011/0095532 A1* | 4/2011 | Schubert | H02P 9/007 |
| | | | 290/44 |
| 2013/0096856 A1* | 4/2013 | Caffrey | G05B 13/048 |
| | | | 702/61 |
| 2013/0187384 A1* | 7/2013 | Li | F03D 9/003 |
| | | | 290/44 |
| 2015/0365014 A1* | 12/2015 | Lin | H02M 7/44 |
| | | | 363/40 |

FOREIGN PATENT DOCUMENTS

| | | |
|---|---|---|
| CN | 102332850 A | 1/2012 |
| CN | 103051281 A | 4/2013 |
| GB | 2121557 A | 12/1983 |
| JP | 2004-104959 A | 4/2004 |
| JP | 2007-295648 A | 11/2007 |
| TW | 201012045 A | 3/2010 |

* cited by examiner

```
┌─────────────────────────────────────────────────────┐
│ Sample grid voltage and generate voltage drop       │─ 701
│ coefficient k according to the grid voltage         │
│ effective value and the rated grid voltage value    │
│ to generate corresponding operation mode            │
│ switching signal                                    │
└─────────────────────────────────────────────────────┘
                          │
                          ▼
┌─────────────────────────────────────────────────────┐
│ Generate frequency decreasing amount Δf1 according  │─ 702
│ to voltage drop coefficient and load active current │
│ component output from inverter                      │
└─────────────────────────────────────────────────────┘
                          │
                          ▼
┌─────────────────────────────────────────────────────┐
│ Generate frequency decreasing amount Δf2 according  │─ 703
│ to DC bus voltage and load active current component │
└─────────────────────────────────────────────────────┘
                          │
                          ▼
┌─────────────────────────────────────────────────────┐
│ Generate target frequency signal according to given │─ 704
│ frequency control signal                            │
└─────────────────────────────────────────────────────┘
                          │
                          ▼
                      ◇ 705
                 Normal operation mode? ──No──┐
                          │                    │
                         Yes                   │
                          ▼                    │
┌─────────────────────────────────────────────┐│─ 706
│ Generate output frequency signal according  ││
│ to target frequency signal                  ││
└─────────────────────────────────────────────┘│
                          │                    │
                          ▼                    │
                      ◇ 707                    │
                 Power reducing                │
                 operation mode? ──No──────────┤
                          │                    │
                         Yes                   │
                          ▼                    │
┌─────────────────────────────────────────────┐│─ 708
│ Generate output frequency signal according  ││
│ to target frequency signal and frequency    ││
│ decreasing amount Δf1                       ││
└─────────────────────────────────────────────┘│
                          │                    │
                          ▼                    │
┌─────────────────────────────────────────────┐│─ 709
│ Generate output frequency signal according  ││
│ to feedback output frequency signal and     ││
│ frequency decreasing amount Δf2             ││
└─────────────────────────────────────────────┘
                          │
                          ▼
┌─────────────────────────────────────────────────────┐
│ Generate three phase modulating signal according to │─ 710
│ output frequency signal, which is used to control   │
│ operation of inverter                               │
└─────────────────────────────────────────────────────┘
```

VARIABLE FREQUENCY SPEED CONTROL SYSTEM AND METHOD OF THE SAME

RELATED APPLICATIONS

This application claims priority to China Application Serial Number 201410241036.9, filed May 30, 2014, which is herein incorporated by reference.

BACKGROUND

Field of Invention

The present disclosure relates to frequency converting and speed regulating technologies. More particularly, the present disclosure relates to a frequency converting and speed regulating system and a method of the same.

Description of Related Art

With increasing requirements for carbon reduction and environmental protection in industrial systems, the applications of frequency-converting speed regulating electric apparatus are used more widely. In recent years, the high-voltage frequency-converting systems are in great demand, and the performance requirements are getting more stringent.

Many grid systems are designed to maintain a long and stable operation of a corresponding frequency-converting system to minimize downtime, and to improve efficiency. In particular, because the huge rotational inertia of large-capacity frequency-converting system, once the suddenly voltage drop of the grid interrupts the operation of the frequency-converting system, it will take a long time to restore the frequency-converting system back to the state of operation after the suddenly voltage drop of the grid. If the variable frequency speed control system can't operate stably, or it takes too long to let the variable frequency speed control system recover from the interrupt status to operational status, will lead to the performance of variable frequency speed control system to be significantly degraded variable frequency speed control

SUMMARY

The disclosure provides a variable frequency speed control system having a low voltage ride through (LVRT) function, the variable frequency speed control system includes a variable frequency drive having a rectifier, a DC bus and an inverter, wherein the rectifier converts a grid voltage to a DC bus voltage, the inverter converts the DC bus voltage to a three phase AC signal according to the DC bus. The variable frequency speed control system includes: a voltage drop detecting module, a frequency control module, an operation mode selecting module, and an inverter control module. The voltage drop detecting module is electrically coupled to a grid, for sampling the grid voltage, generating a voltage drop coefficient according to the sampled grid voltage and a rated grid voltage, and generating a corresponding operation mode switching signal according to the voltage drop coefficient. The frequency control module generates a target frequency signal according to a given frequency control signal. The operation mode selecting module receives the target frequency signal and a frequency decreasing amount and generates an output frequency signal according to the operation mode switching signal. The inverter control module generates a three phase modulating signal according to the output frequency signal, which is used to control the operation of inverter.

Another aspect of the present disclosure is a variable frequency speed control method, which is used in the variable frequency speed control system. The variable frequency speed control method includes the steps outlined below. The grid voltage is sampled, a voltage drop coefficient is generated according to the grid voltage and a rated grid voltage, and a corresponding operation mode switching signal is generated according to the voltage drop coefficient. A target frequency signal is generated according to a given frequency control signal. The target frequency signal and a frequency decreasing amount is received, and an output frequency signal is generated according to the operation mode switching signal. A three phase modulating signal is generated according to the output frequency signal, which is used to control the operation of inverter.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections. In the following exemplary embodiments and the accompanying drawings, the components that are not related to the present disclosure have been omitted from the drawings, and are drawn in the size ratio between the elements in the drawings are only use for the understanding, and not meant to limit the actual embodiments of the present disclosure in scale.

The terms "first", "second", . . . etc., in the article do not refer to any specific order, nor intended to limit the present disclosure, it is only used for distinguishing the differences between components or operations with the same technological descriptions.

Figure 1:
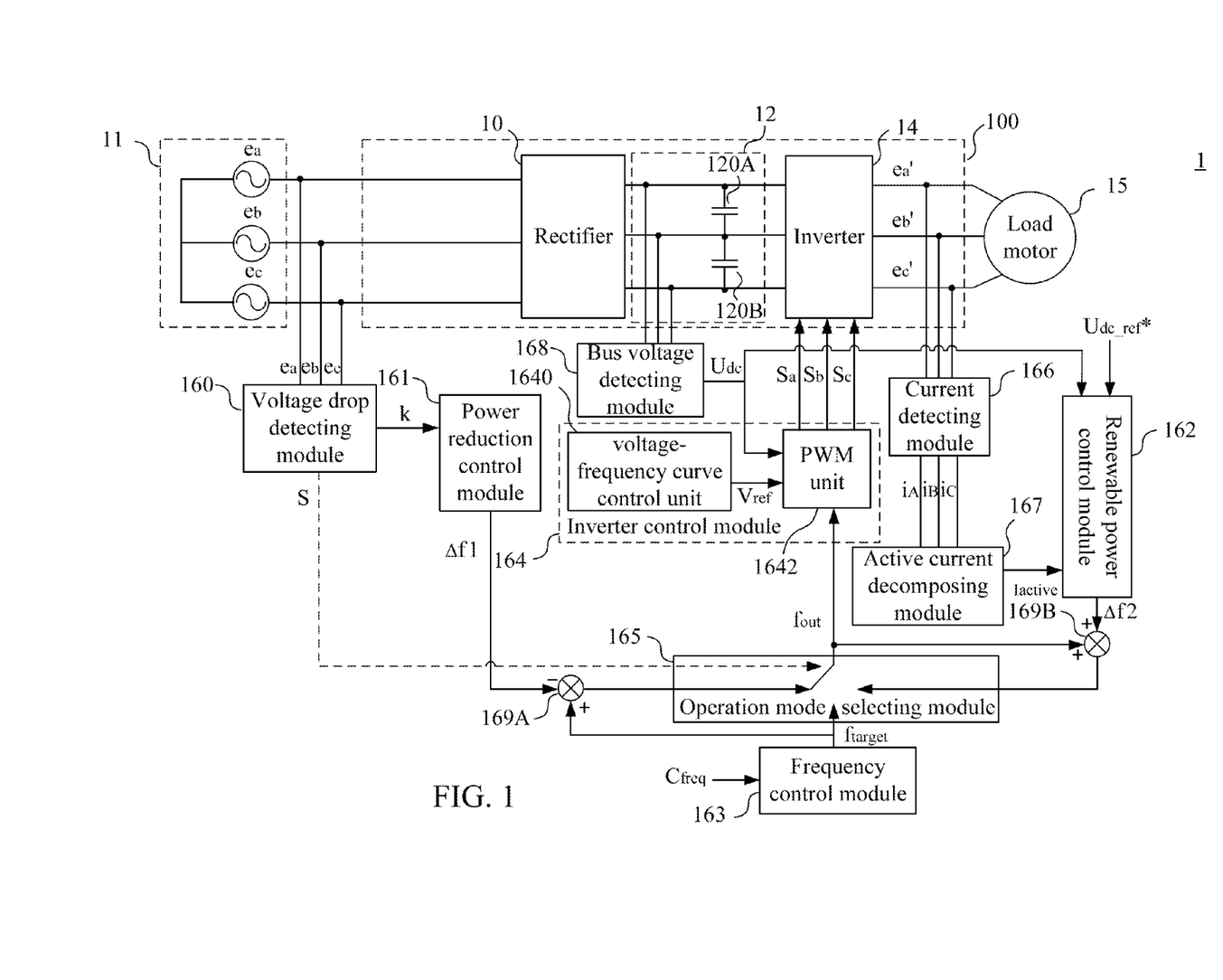
FIG. 1 is a block diagram illustrating a variable frequency speed control system according to an exemplary embodiment of the present disclosure.

Please refer to FIG. 1. FIG. 1 is a block diagram illustrating a variable frequency speed control system 1 according to an exemplary embodiment of the present disclosure.

The variable frequency speed control system 1 includes a variable frequency drive 100, a voltage drop detecting module 160, a frequency control module 163, an inverter control module 164, an operation mode selecting module 165, a current detecting module 166, an active current decomposing module 167 and a bus voltage detecting module 168.

Wherein the variable frequency drive 100 has a rectifier 10, a DC bus 12 and an inverter 14.

The rectifier 10 is electrically coupled to a grid 11, in an exemplary embodiment, the rectifier 10 includes a plurality of switching elements (not shown), such as (but not limited to) Insulated Gate Bipolar Transistors (IGBT), in addition, by the on and off of the switching elements, to converts the grid voltages $e_a$, $e_b$, and $e_c$ to the DC bus voltage $U_{dc}$.

In an exemplary embodiment, the variable frequency speed control system 1 can further include a filter, the rectifier 10 cam receive the grid voltages $e_a$, $e_b$, and $e_c$ via the filter. The filter can constrain the harmonic current which flows into the grid 11.

The DC bus 12 is used for transmitting the DC bus voltage $U_{dc}$. In an exemplary embodiment, the DC bus 12 may include DC bus capacitors 120A and 120B, to provide the support and the filtering function to the DC bus voltage $U_{dc}$.

The inverter 14 is electrically coupled to the rectifier 10 via the DC bus 12, to convert the DC bus voltage Udc into the three phase AC signal $e_a'$, $e_b'$, and $e_c'$ via the DC bus 12. In an exemplary embodiment, the inverter 14 further is electrically coupled to a load motor 15, to drive the load motor 15 according the three phase AC signal $e_a'$, $e_b'$, and $e_c'$.

The voltage drop detecting module 160 is electrically coupled to the grid 11, to sample the grid voltage, and generate a voltage drop coefficient k according to the sampled grid voltage and a rated grid voltage. The voltage drop detecting module 160 further generates a corresponding operation mode switching signal S according to the voltage drop coefficient k. The frequency control module 163 generates a target frequency signal $f_{target}$ according to a given frequency control signal $C_{freq}$. The operation mode selecting module 165 receives the target frequency signal $f_{target}$ and the frequency decreasing amount, and generates an output frequency signal $f_{out}$ according to the operation mode switching signal S.

In an exemplary embodiment, the frequency decreasing amount received by the operation mode selecting module 165 is a dynamic frequency decreasing amount from a power reduction control module 161. Accordingly, the variable frequency speed control system of the present disclosure can switch between a normal operation mode and a power reducing operation mode.

In a specific exemplary embodiment, the frequency decreasing amount received by the operation mode selecting module 165 is a power re-generation frequency decreasing amount from a renewable power control module 162. Accordingly, the variable frequency speed control system of the present disclosure can switch between the normal operation mode and a renewable power operation mode.

Those skilled in the art should be appreciated that in other exemplary embodiments of the present disclosure, the variable frequency speed control system can include both the power reduction control module 161 and the renewable power control module 162, so that the variable frequency speed control system can switch among the normal operation mode, the power reducing operation mode and renewable power operation mode according to the real time voltage drop coefficient generated by the voltage drop detecting module 160. In other words, the voltage drop detecting module 160, the power reduction control module 161, the renewable power control module 162, the frequency control module 163, the inverter control module 164 and the operation mode selecting module 165 can adaptively adjust the variable frequency drive 100 according to the operation conditions of the grid 11 and the variable frequency drive 100, to maintain the stability of the frequency converting and speed regulating system 1. The following descriptions will disclose more detail of the structure and operation of the aforementioned elements.

Figure 2:
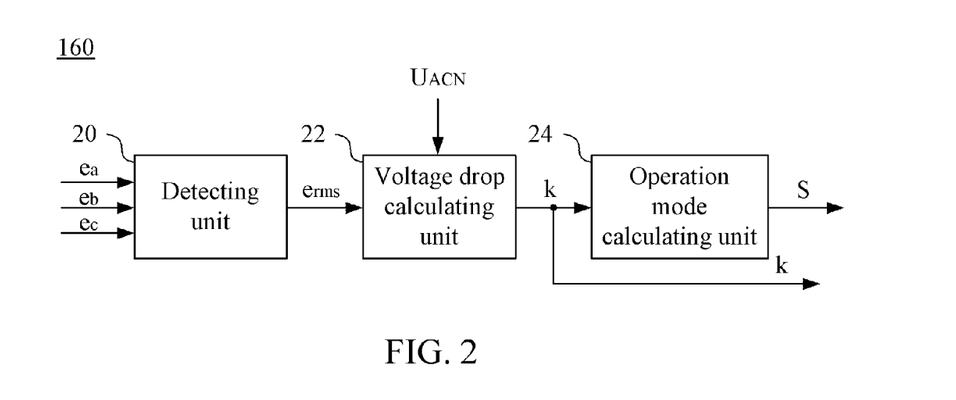
FIG. 2 is a block diagram illustrating the voltage drop detecting module according to an exemplary embodiment of the present disclosure.

Please refer to FIG. 2. FIG. 2 is a block diagram illustrating the voltage drop detecting module 160 according to an exemplary embodiment of the present disclosure.

The voltage drop detecting module 160 is electrically coupled to the grid 11, and includes: a detecting unit 20, a voltage drop calculating unit 22 and an operation mode calculating unit 24.

The detecting unit 20 receives the grid voltage $e_a$, $e_b$ and $e_c$ to calculate a grid voltage effective value $e_{rms}$ according to a calculation based on the grid voltage $e_a$, $e_b$ and $e_c$. In an exemplary embodiment, for example, the grid voltage effective value $e_{rms}$ can be calculated according to, but not limited to the root mean square of the grid voltage $e_a$, $e_b$ and $e_c$.

The voltage drop calculating unit 22 calculates the voltage drop coefficient k based on the grid voltage effective value $e_{rms}$ and the rated grid voltage value. The voltage drop coefficient k represents the actual voltage drop situation of the grid 11.

The operation mode calculating unit 24 generates a corresponding operation mode switching signal S according to the voltage drop coefficient k.

Figure 3:
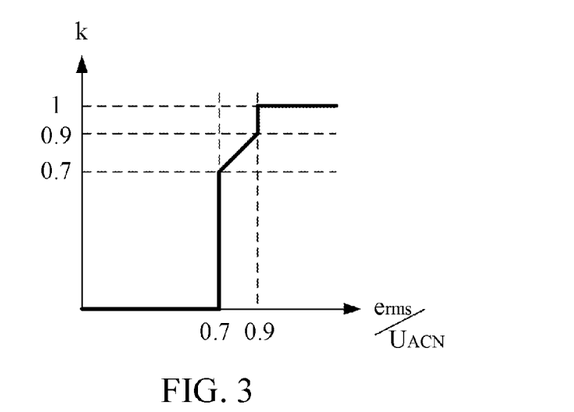
FIG. 3 is a diagram depicting the relationship of the voltage drop coefficient k and a ratio of the grid voltage effective value $e_{rms}$ to the rated grid voltage value according to an exemplary embodiment of the present disclosure.
Figure 4:
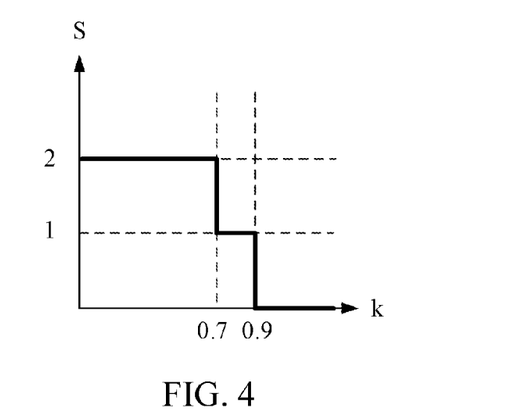
FIG. 4 is a diagram depicting the relationship of the voltage drop coefficient k and the operation mode switching signal S according to an exemplary embodiment of the present disclosure.

Please refer to FIG. 3 in conjunction with FIG. 4. FIG. 3 is a diagram depicting the relationship of the voltage drop coefficient k and a ratio of the grid voltage effective value $e_{rms}$ to the rated grid voltage value according to an exemplary embodiment of the present disclosure. FIG. 4 is a diagram depicting the relationship of the voltage drop coefficient k and the operation mode switching signal S according to an exemplary embodiment of the present disclosure.

In an exemplary embodiment, when the grid voltage effective value $e_{rms}$ is greater than a lower limit value of the normal operation voltage, such as 90% of the rated grid voltage value, the voltage drop calculating unit 22 will output the voltage drop coefficient k having the value 1. At this time, the operation mode calculating unit 24 determines the grid 11 works in a normal situation without voltage drop, and hence outputs the operation mode switching signal S having the value 0 which corresponds a normal operation mode of the system.

When the grid voltage effective value $e_{rms}$ is both smaller than a lower limit value of the normal operation voltage and greater than the lower limit value of the power reducing operation, such as smaller than 90% of the rated grid voltage value and greater than 70% rated grid voltage value, then the voltage drop calculating unit 22 will make the voltage drop coefficient k output a value which is a ratio of the grid voltage effective value $e_{rms}$ to the rated grid voltage value, that is, a value falls between 0.7~0.9. The operation mode calculating unit 24 determines that there is a slightly voltage drop in the grid 11, and outputs the operation mode switching signal S having the value 1 which corresponds a power reducing operation mode of the system.

In addition, when the grid voltage effective value $e_{rms}$ is smaller than the lower limit value of the power reducing operation, such as smaller than 70% of the rated grid voltage value, then the voltage drop calculating unit 22 will output the voltage drop coefficient k having the value 0. The operation mode calculating unit 24 determines that the grid 11 works in a serious voltage drop condition, and outputs the operation mode switching signal S having the value 2 which corresponds to the renewable power operation mode of the system.

It is to be noted that the aforementioned values of the operation mode switching signal S is an illustrious example, and it can vary in other exemplary embodiments of the present disclosure.

Figure 5:
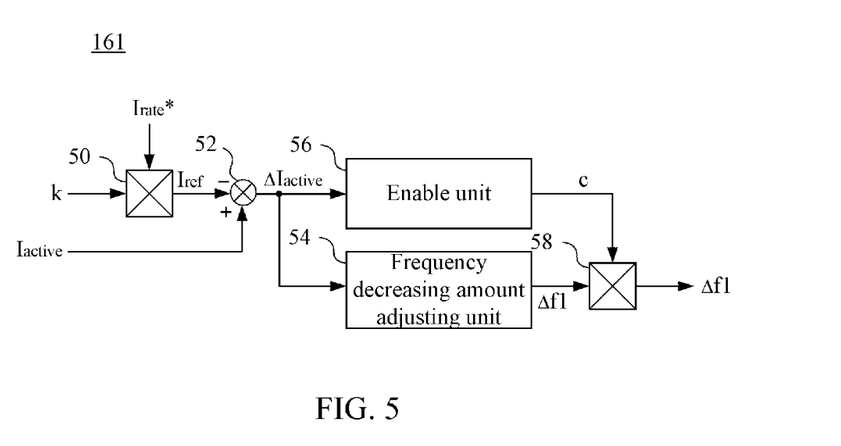
FIG. 5 is a detail diagram illustrating the power reduction control module according to an exemplary embodiment of the present disclosure.

Please refer to FIG. 5. FIG. 5 is a detail diagram illustrating the power reduction control module 161 according to an exemplary embodiment of the present disclosure.

The power reduction control module 161 includes a reference current calculating unit 50, a current difference calculating unit 52, a frequency decreasing amount adjusting unit 54, an enable unit 56 and an output unit 58.

The reference current calculating unit 50 generates a maximum active reference current $I_{ref}$ according to a rated active current $I_{rate}*$ of the inverter 14 and the voltage drop coefficient k. Wherein the rated active current $I_{rate}*$ is a maximum allowed output current value under a rated frequency. Therefore, the maximum active reference current $I_{ref}$ is a maximum allowed output current value in accordance with a voltage drop coefficient k considering actual operation situation of the grid 11. In an exemplary embodiment, the reference current calculating unit 50 is a multiplier to calculate the maximum active reference current $I_{ref}$ according to a voltage drop condition reflected by the voltage drop coefficient k.

The current difference calculating unit 52 generates a current difference $\Delta I_{active}$ according to the maximum active reference current $I_{ref}$ and the load active current component $I_{active}$. The load active current component $I_{active}$ is derived by the following steps: firstly, the current detecting module 166 in FIG. 1 derives the three phase current signal $i_A$, $i_B$, and $i_C$ from the three phase AC signal $e_a'$, $e_b'$, and $e_c'$ outputted from the inverter 14. Subsequently, the active current decomposing module 167 derives the load active current component $I_{active}$ from the three phase current signal $i_A$, $i_B$, and $i_C$. The load active current component $I_{active}$ can reflect the magnitude of the output power of the inverter 14. People skilled in this art may understand that, in other exemplary embodiments of the present disclosure, all the alternative electricity parameters which reflect the magnitude of the output power of the inverter may be used together with the voltage drop coefficient to generate the frequency decreasing amount, and the above variations fall within the scope of the present disclosure. In an exemplary embodiment, the current difference calculating unit 52 is, for example, but not limited to, an adder, which has one positive input terminal and a negative input terminal, to execute the function of subtracting the maximum active reference current $I_{ref}$ from the load active current component $I_{active}$.

The frequency decreasing amount adjusting unit 54 further generates the frequency decreasing amount $\Delta f1$ according to the current difference $\Delta I_{active}$. In an exemplary embodiment, the frequency decreasing amount adjusting unit 54 is a Proportion Integration (PI) controller or a Proportion Integration Differentiation (PID) controller, to generate the frequency decreasing amount $\Delta f1$ which allows the load active current component $I_{active}$ tracking the maximum active reference current $I_{ref}$.

The enable unit 56 determines whether the load active current component $I_{active}$ is greater than the maximum active reference current $I_{ref}$ according to the current difference $\Delta I_{active}$. In other words, the enable unit 56 determines whether the current difference $\Delta I_{active}$ is greater than 0. The enable unit 56 then generates a signal c according to the result of the determination. When the current difference $\Delta I_{active}$ is greater than 0, which stands for the condition that the load active current component $I_{active}$ is greater than the maximum active reference current $I_{ref}$, the signal c outputs a high level. On the contrary, when the current difference $\Delta I_{active}$ is not greater than 0, the signal c outputs a low level.

The output unit 58 receives the frequency decreasing amount $\Delta f1$, and is enabled when the signal c with a high level is received to output the frequency decreasing amount $\Delta f1$. Therefore, the signal c with a high level is the signal used to enable the output unit 58.

Figure 6:
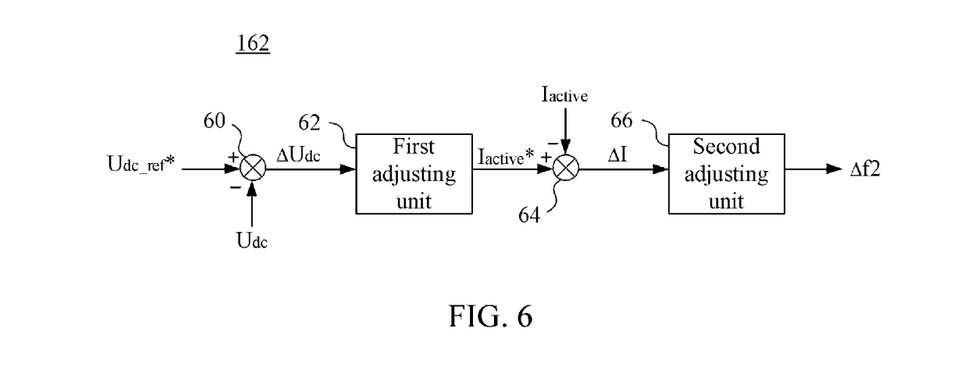
FIG. 6 is a diagram illustrating the renewable power control module according to an exemplary embodiment of the present disclosure.

Please refer to FIG. 6. FIG. 6 is a diagram illustrating the renewable power control module 162 according to an exemplary embodiment of the present disclosure.

The renewable power control module 162 includes a voltage difference calculating unit 60, a first adjusting unit 62, a current difference calculating unit 64 and a second adjusting unit 66.

The voltage difference calculating unit 60 calculates the voltage difference $\Delta U_{dc}$ according to the DC bus voltage $U_{dc}$ and the maintaining command voltage $U_{dc\_ref}*$. In an exemplary embodiment, the value of the DC bus voltage $U_{dc}$ received by the voltage difference calculating unit 60 is derived by the bus voltage detecting module 168 in FIG. 1. In an exemplary embodiment, the voltage difference calculating unit 60 is, for example, but not limited to, an adder, which has one positive input terminal and a negative input terminal, to execute the function of subtracting the DC bus voltage $U_{dc}$ from the maintaining command voltage $U_{dc\_ref}*$.

The first adjusting unit 62 generates the renewable power reference current $I_{active*}$ according to the voltage difference $\Delta U_{dc}$. In an exemplary embodiment, the first adjusting unit 62 is a PI controller or a PID controller, to generate the renewable power reference current $I_{active*}$ which allows the DC bus voltage $U_{dc}$ tracking the maintaining command voltage $U_{dc\_ref}*$.

The current difference calculating unit 64 calculates the current difference $\Delta I$ according to the output power $I_{active}$ and the renewable power reference current $I_{active*}$. In an exemplary embodiment, the current difference calculating unit 64 is, for example, but not limited to, an adder, which has one positive input terminal and a negative input terminal, to execute the function of subtracting the output power $I_{active}$ from the renewable power reference current $I_{active*}$.

The second adjusting unit 66 generates the frequency decreasing amount Δf2 according to the current difference ΔI. In an exemplary embodiment, the second adjusting unit 66 is a PI controller or a PID controller, to generate the frequency decreasing amount Δ2 which allows the output power $I_{active}$ to track the renewable power reference current $I_{active}$.

The frequency control module 163 generates the target frequency signal $f_{target}$ according to the given frequency control signal $C_{freq}$. In an exemplary embodiment, the given frequency control signal $C_{freq}$ is generated by the user via an input module (not shown).

The operation mode selecting module 165 selects the operation mode according to the operation mode switching signal S which was generated by the operation mode calculating unit 24 according to the voltage drop coefficient k, thereby generates the output frequency signal $f_{out}$. In an exemplary embodiment, the operation mode selecting module 165 is a switch to select one of a plurality of signal sources to generate the output frequency signal $f_{out}$.

When the operation mode switching signal S output a value "0" corresponding to the normal operation mode of the variable frequency speed control system 1, the operation mode selecting module 165 selects the frequency control module 163 as the signal source, to directly output the target frequency signal $f_{target}$ as the output frequency signal $f_{out}$.

When the operation mode switching signal S output a value "1" corresponding to the power reducing operation mode of the variable frequency speed control system 1, the operation mode selecting module 165 generates the output frequency signal $f_{out}$ according to the target frequency signal $f_{target}$ and the frequency decreasing amount Δf1. In an exemplary embodiment, the frequency converting and speed regulating system 1 further includes an adder 169A, which has one positive input terminal and a negative input terminal, to execute the function of subtracting the frequency decreasing amount Δf1 from the target frequency signal $f_{target}$. The operation mode selecting module 165 selects the adder 169A as the signal source, to output a difference of the target frequency signal $f_{target}$ and the frequency decreasing amount f1 as the output frequency signal $f_{out}$.

When the operation mode switching signal S output a value "2" corresponding to the renewable power operation mode of the frequency converting and speed regulating system 1, the operation mode selecting module 165 generates the output frequency signal $f_{out}$ according to the feedback output frequency signal $f_{out}$ and the frequency decreasing amount Δf2. In an exemplary embodiment, the variable frequency speed control system 1 further includes an adder 169B having two positive input terminals to execute the function of add the feedback output frequency signal $f_{out}$ and the frequency decreasing amount Δf2. The operation mode selecting module 165 selects the adder 169B as the signal source to make the sum of the feedback output frequency signal $f_{out}$ and frequency decreasing amount Δf2 as the output frequency signal $f_{out}$.

The inverter control module 164 further generates a set of three phase modulating signals $S_A$, $S_B$ and $S_C$ according to the output frequency signal $f_{out}$ for controlling the operation of the inverter 14. In this exemplary embodiment, the inverter control module 164 includes: a voltage-frequency curve control unit 1640 and a pulse width modulation (PWM) unit 1642. Wherein the voltage-frequency curve control unit 1640 generates the reference voltage $V_{ref}$ according to the output frequency signal $f_{out}$, and the PWM unit 1642 generates the three phase modulating signal $S_A$, $S_B$ and $S_C$ according to the reference voltage $V_{ref}$, the DC bus voltage $U_{dc}$ and the output frequency signal $f_{out}$, to control the switching elements of the inverter 14.

Please note that the structure of the inverter control module 164 illustrated in FIG. 1 is used for illustrative purposes only and are not meant to be limitations of the present disclosure, in other exemplary embodiments of the present disclosure, the inverter control module 164 can be achieved by other circuit structure with aforementioned functions.

If the output power of the variable frequency speed control system 1 is the same under the condition of having a slightly voltage drop in the grid 11, a corresponding large input current is generated since the input power does not change. Therefore, according to the adjustment of the frequency decreasing amount Δf1, the voltage modulation device can reduce the power consumption of the inverter 11 and the load motor 15 driven by the inverter 14 when there is a slightly voltage drop in the grid 11. The overcurrent protection mechanism triggered by the large input current is therefore avoided. The stable operation of the variable frequency speed control system 1 is maintained.

When there is a serious voltage drop in the grid 11, the operation of the variable frequency speed control system 1 will be suspended. Under such a condition, the inverter 14 can make the driven load motor 15 executes the power re-generation according to the adjustment of the frequency decreasing amount Δf2. The DC bus voltage $U_{dc}$ is maintained to reduce or eliminate the suspended period of the variable frequency speed control system 1 when the power of the grid 11 recovers.

Figure 7:
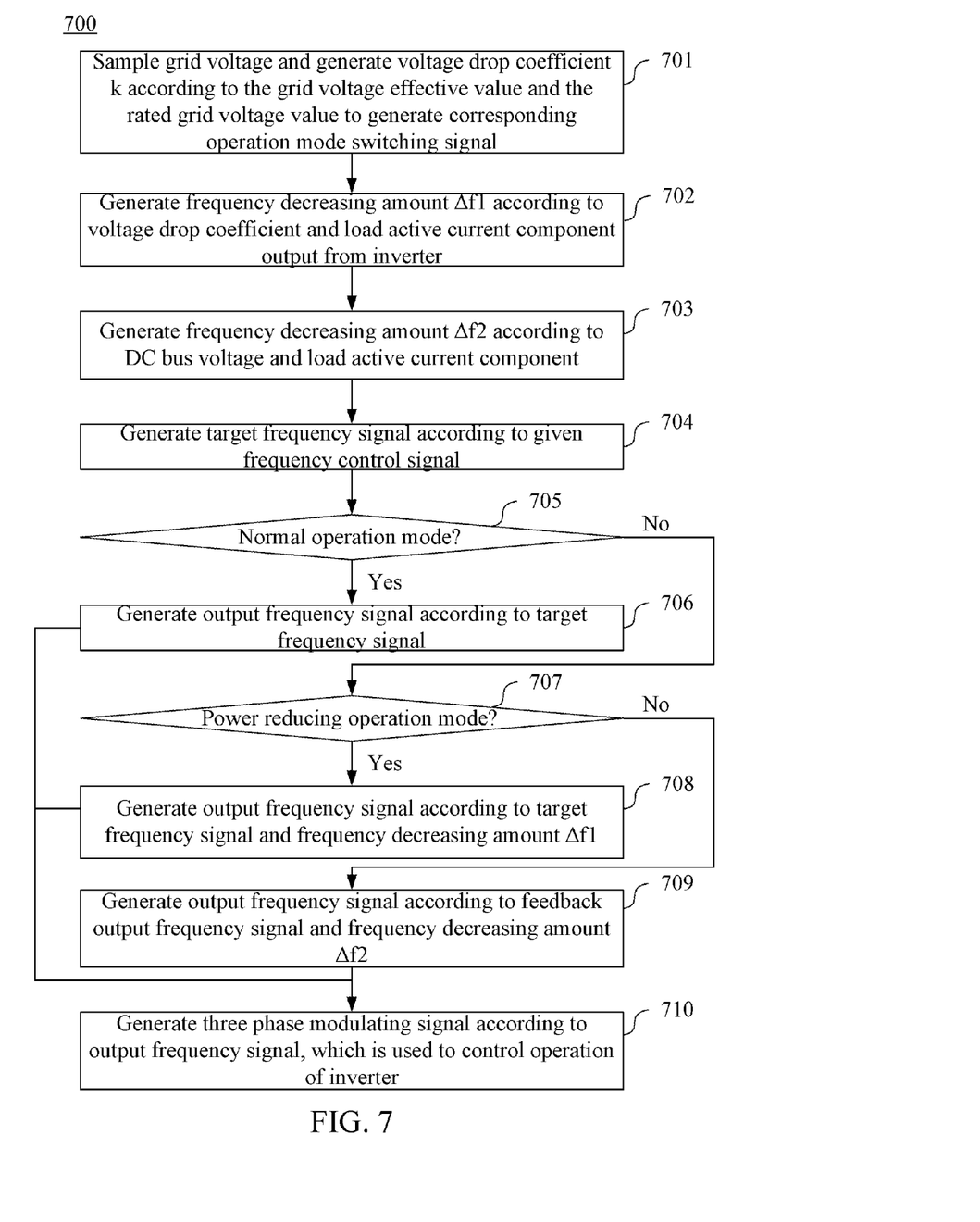
FIG. 7 is a flow chart of a variable frequency speed control method according to an exemplary embodiment of the present disclosure.

Please refer to FIG. 7. FIG. 7 is a flow chart of a variable frequency speed control method 700 according to an exemplary embodiment of the present disclosure. The variable frequency speed control method 700 can be applied to the variable frequency speed control system 1 in FIG. 1. The variable frequency speed control method 700 includes the following steps.

In step 701, the voltage drop detecting module 160 is used to sample the grid voltage effective value $e_{rms}$, and then generate the voltage drop coefficient k according to the grid voltage effective value $e_{rms}$ and the rated grid voltage value $U_{ACN}$, and to further generate a corresponding operation mode switching signal S according to the voltage drop coefficient k.

In step 702, the power reduction control module 161 is used to generate the frequency decreasing amount Δf1 according to the voltage drop coefficient k and the load active current component $I_{active}$ output from the inverter 14. The load active current component $I_{active}$ can represent the magnitude of the output power of the inverter 14.

In Step 703, the renewable power control module 162 is used to generate the frequency decreasing amount Δf2 according to the DC bus voltage $U_{dc}$ and the load active current component $I_{active}$.

In step 704, the frequency control module 163 is used to generate a target frequency signal $f_{target}$ according to the given frequency control signal $C_{freq}$.

In step 705, whether the variable frequency speed control system 1 works in a normal operation mode is determined. When the variable frequency speed control system 1 works in the normal operation mode, the operation mode switching signal S makes the operation mode selecting module 165 generate the output frequency signal $f_{out}$ according to the target frequency signal $f_{target}$ in step 706.

When the frequency converting and speed regulating system 1 is not under the normal operation mode, in step 707, the flow chart of the present disclosure further determines if the variable frequency speed control system 1 works in the power reducing operation mode. When the variable frequency speed control system 1 works in the power reducing operation mode, the operation mode switching signal S makes the operation mode selecting module 165 generate the output frequency signal $f_{out}$ according to the target frequency signal $f_{target}$ and the frequency decreasing amount $\Delta f1$ in step 708.

When the variable frequency speed control system 1 does not work in the power reducing operation mode, the variable frequency speed control system 1 is determined to work in the renewable power operation mode, and the operation mode switching signal S makes the operation mode selecting module 165 generate the output frequency signal $f_{out}$ according to the sum of the feedback output frequency signal $f_{out}$ and the frequency decreasing amount $\Delta f2$ in step 709.

Next, after the step 706, step 708 or step 709, the inverter control module 164 is used to generate three phase modulating signal $S_A$, $S_B$ and $S_C$ according to the output frequency signal $f_{out}$ for controlling the operation of the inverter 14 in step 710.

Similarly, people have ordinary skills in this art can understand the aforementioned variable frequency speed control method 700 is merely an exemplary embodiment, in other exemplary embodiments of the present disclosure, the variable frequency speed control system can only include the normal operation mode and the power reducing operation mode, hence the corresponding variable frequency speed control method only needs to determine if the system works in which mode of the aforementioned two modes. In some other exemplary embodiments, the variable frequency speed control system can merely include the normal operation mode and the renewable power operation mode, thereby the corresponding variable frequency speed control method only needs to determine if the system works in which mode of the aforementioned two modes.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A variable frequency speed control system having a Low Voltage Ride Through (LVRT) function which comprises a variable frequency drive (VFD) having a rectifier, a DC bus and an inverter, wherein the rectifier converts a grid voltage to a DC bus voltage, the inverter converts the DC bus voltage to a three phase AC signal by the DC bus, the variable frequency speed control system further comprising:

a voltage drop detecting module electrically coupled to a grid, for sampling the grid voltage, generating a voltage drop coefficient according to the sampled grid voltage and a rated grid voltage, and generating a corresponding operation mode switching signal according to the voltage drop coefficient;

a bus voltage detecting module electrically coupled to the DC bus, for sampling the DC bus voltage;

a current detecting module electrically coupled to the inverter, for sampling a three phase current signal of the three phase AC signal outputted from the inverter;

an active current decomposing module coupling with the current detecting module, for retrieving a load active current component of the inverter from the three phase current signal sampled by the current detecting module to generate a load active current component;

a power reduction control module coupling with the voltage drop detecting module, for receiving the voltage drop coefficient from the voltage drop detecting module and the load active current component from the active current decomposing module to generate a first frequency decreasing amount;

renewable power control module coupling with the bus voltage detecting module and the active current decomposing module, for receiving the DC bus voltage from the bus voltage detecting module, a maintaining command voltage and the load active current component from the active current decomposing module to generate a second frequency decreasing amount;

a frequency control module for generating target frequency signal according to a given frequency control signal;

an operation mode selecting module coupling with the power reduction control module, the renewable power control module and the frequency control module, for receiving the target frequency signal, the first frequency decreasing amount and the second frequency decreasing amount to generate an output frequency signal according to the operation mode switching signal; and an inverter control module for generating a three phase modulating signal according to the output frequency signal, which is used to control the operation of inverter.

2. The variable frequency speed control system of claim 1, wherein the power reduction control module further comprises:

a reference current calculating unit, for generating a maximum active reference current according to a rated active current of the inverter and the voltage drop coefficient;

a current difference calculating unit, for generating a current difference according to the maximum active reference current and the load active current component of the inverter;

a frequency decreasing amount adjusting unit, for generating the frequency decreasing amount according to the current difference;

an enable unit, for determining whether the load active current component is greater than the maximum active reference current according to the current difference, and generating an enabling signal when the load active current component is greater than the maximum active reference current; and an output unit, for outputting the frequency decreasing amount when the enabling signal is received.

3. The variable frequency speed control system of claim 1, wherein when the variable frequency speed control system works in power reducing operation mode, the operation mode selecting module generates the output frequency signal according to the target frequency signal and the first frequency decreasing amount.

4. The variable frequency speed control system of claim 1, wherein when the variable frequency speed control system works in a renewable power operation mode, the operation mode selecting module generates the output frequency signal according the feedback output frequency signal and the second frequency decreasing amount.

5. The variable frequency speed control system of claim 1, wherein the renewable power control module further comprises:
    a voltage difference calculating unit, for calculating a voltage difference according to the DC bus voltage and the maintaining command voltage;
    a first adjusting unit, for generating a renewable power reference current according to the voltage difference;
    a current difference calculating unit, for calculating a current difference according to the load active current component of the inverter and the renewable power reference current; and
    a second adjusting unit, for generating the frequency decreasing amount according to the current difference.

6. The variable frequency speed control system of claim 1, wherein the voltage drop detecting module further comprises:
    a detecting unit for receiving the grid voltage and calculating a grid voltage effective value according to the grid voltage;
    a voltage drop calculating unit for calculating the voltage drop coefficient based on the grid voltage effective value and the rated grid voltage value; and
    an operation mode calculating unit for generating the corresponding operation mode switching signal according to the voltage drop coefficient.

7. The variable frequency speed control system of claim 6, wherein when the voltage drop coefficient falls within 0.7~0.9, the operation mode switching signal corresponds to the power reducing operation mode.

8. A variable frequency speed control method used in a variable frequency speed control system, the variable frequency speed control method comprising:
    sampling a grid voltage by a voltage drop detecting module, generating a voltage drop coefficient according to the grid voltage and a rated grid voltage, and generating a corresponding operation mode switching signal according to the voltage drop coefficient;
    sampling a DC bus voltage by a bus voltage detecting module;
    sampling a three phase current signal of the three phase AC signal outputted from an inverter by a current detecting module;
    retrieving a load active current component of the inverter from the three phase current signal to generate a load active current component by an active current decomposing module;
    generating a first frequency decreasing amount according to the voltage drop coefficient and the load active current component by a power reduction control module;
    generating a second frequency decreasing amount according to the DC bus voltage, a maintaining command voltage and the load active current component by a renewable power control module;
    generating a target frequency signal according to a given frequency control signal by a frequency control module;
    receiving the target frequency signal, the first frequency decreasing amount and the second frequency decreasing amount to generate an output frequency signal according to the operation mode switching signal by an operation mode selecting module; and
    generating a three phase modulating signal according to the output frequency signal, which is used to control operation of the inverter by an inverter control module.

9. The variable frequency speed control method of claim 8, further comprising:
    generating a maximum active reference current according to a rated active current of the inverter and the voltage drop coefficient;
    generating a current difference according to the maximum active reference current and the load active current component of the inverter;
    generating the frequency decreasing amount according to the current difference;
    determining whether the load active current component is greater than the maximum active reference current according to the current difference, and generating an enabling signal when the load active current component is greater than the maximum active reference current; and
    outputting the frequency decreasing amount when the enabling signal is received.

10. The variable frequency speed control method of claim 8, further comprising:
    when the variable frequency speed control system works in power reducing operation mode, the output frequency signal is generated according to the target frequency signal and the first frequency decreasing amount.

11. The variable frequency speed control method of claim 8, further comprising:
    when the variable frequency speed control system works in a renewable power operation mode, the output frequency signal is generated according to the feedback output frequency signal and the second frequency decreasing amount.

12. The variable frequency seed control hod of claim 8, further comprising:
    calculating a voltage difference according to the DC bus voltage and the maintaining command voltage;
    generating a renewable power reference current according to the voltage difference;
    calculating a current difference according to the load active current component of the inverter and the renewable power reference current; and
    generating the second frequency decreasing amount according to the current difference.

13. The variable frequency speed control method of claim 8, further comprising:
    receiving the grid voltage and calculating a grid voltage effective value;
    calculating the voltage drop coefficient based on the grid voltage effective value and the rated grid voltage value; and
    generating the corresponding operation mode switching signal according to the voltage drop coefficient.

14. The variable frequency speed control method of claim 13, wherein when the voltage drop coefficient falls within 0.7~0.9, the operation mode switching signal corresponds to the power reducing operation mode.

* * * * *